(12) United States Patent
Sato et al.

(10) Patent No.: US 8,886,358 B2
(45) Date of Patent: Nov. 11, 2014

(54) ROBOT CONTROLLER AND ROBOT SYSTEM

(75) Inventors: Kaori Sato, Fujimi (JP); Hiroshi Hasegawa, Chino (JP)

(73) Assignee: Seiko Epson Corporation (JP)

( * ) Notice: Subject to any disclaimer, the term of this patent is extended or adjusted under 35 U.S.C. 154(b) by 262 days.

(21) Appl. No.: 13/431,445

(22) Filed: Mar. 27, 2012

(65) Prior Publication Data

US 2012/0253512 A1 Oct. 4, 2012

(30) Foreign Application Priority Data

Mar. 30, 2011 (JP) ................................. 2011-074390

(51) Int. Cl.
*B25J 15/00* (2006.01)
*B25J 9/00* (2006.01)
*B25J 9/16* (2006.01)

(52) U.S. Cl.
CPC .............. *B25J 9/1669* (2013.01); *B25J 9/1697* (2013.01); *B25J 9/1661* (2013.01); *B25J 9/1612* (2013.01); *G05B 2219/39543* (2013.01); *G05B 2219/40395* (2013.01); *Y10S 901/08* (2013.01)
USPC ............................... 700/253; 700/262; 901/8

(58) Field of Classification Search
CPC ...... B25J 9/1697; B25J 9/1661; B25J 9/1669; B25J 13/085; B25J 15/00; B25J 9/1612; G05B 2219/40053; G05B 2219/39476; G05B 2219/39479; G05B 2219/39536; G05B 2219/37555; G05B 2219/39484; G05B 2219/39527; G05B 2219/39543
USPC ......... 700/245, 246, 250, 251, 253, 258, 259, 700/262; 901/2, 8, 14, 31, 32, 34, 35, 47
See application file for complete search history.

(56) References Cited

U.S. PATENT DOCUMENTS

| | | | |
|---|---|---|---|
| 5,325,468 A | 6/1994 | Terasaki et al. | |
| 5,513,299 A | 4/1996 | Terasaki et al. | |
| 7,187,998 B2 | 3/2007 | Okamoto et al. | |
| 7,206,668 B2 | 4/2007 | Okamoto et al. | |
| 7,209,803 B2 | 4/2007 | Okamoto et al. | |
| 2004/0172164 A1* | 9/2004 | Habibi et al. | 700/245 |
| 2004/0190766 A1* | 9/2004 | Watanabe et al. | 382/154 |
| 2008/0240511 A1* | 10/2008 | Ban et al. | 382/108 |
| 2011/0010009 A1* | 1/2011 | Saito | 700/253 |
| 2011/0098859 A1* | 4/2011 | Irie et al. | 700/259 |
| 2011/0288667 A1* | 11/2011 | Noda et al. | 700/98 |

FOREIGN PATENT DOCUMENTS

| | | |
|---|---|---|
| JP | 07-067673 | 7/1995 |
| JP | 2000-127070 | 5/2000 |
| JP | 2004-268161 | 9/2004 |
| JP | 2009-214212 | 9/2009 |

* cited by examiner

*Primary Examiner* — Jason Holloway
(74) *Attorney, Agent, or Firm* — Harness, Dickey & Pierce, P.L.C.

(57) ABSTRACT

A robot controller includes an input unit that receives operation instruction information, a database that stores grasp pattern information, and a processing unit that performs control processing based on information from the input unit and information from the database, and the input unit receives first to N-th operation instructions as operation instruction information, the processing unit loads i-th grasp pattern information that enables execution of the i-th operation instruction and j-th grasp pattern information that enables execution of the j-th operation instruction as the next operation instruction to the i-th operation instruction from the database, and performs control processing based on the i-th grasp pattern information and the j-th grasp pattern information.

20 Claims, 16 Drawing Sheets

HAND STATE

| HAND STATE ID | HAND ID | HAND POSITION |
|---|---|---|

HAND

| HAND ID | HAND SHAPE |
|---|---|

WORK STATE

| WORK STATE ID | WORK ID | WORK POSITION |
|---|---|---|

WORK

| WORK ID | WORK SHAPE |
|---|---|

GRASP PATTERN

| GRASP PATTERN ID | HAND STATE ID | WORK STATE ID |
|---|---|---|

EXECUTABLE GRASP PATTERN

| EXECUTABLE GRASP PATTERN ID | GRASP PATTERN ID1 | GRASP PATTERN ID2 |
|---|---|---|

FIG. 3

| | GRASP DIRECTION | GRASP SURFACE |
|---|---|---|
| GROUP OF GRASP PATTERNS EXECUTABLE IN STATE 1 | | |
| 1 | A | B-B' |
| 2 | A | C-C' |
| 3 | B | C-C' |
| 4 | C | B-B' |
| 5 | B' | C-C' |
| 6 | C' | B-B' |

| | GRASP DIRECTION | GRASP SURFACE |
|---|---|---|
| GROUP OF GRASP PATTERNS EXECUTABLE IN STATE 2 | | |
| 1 | A | B-B' |
| 2 | B | A-A' |
| 3 | A' | B-B' |
| 4 | B' | A-A' |
| 5 | C | B-B' |
| 6 | C | A-A' |

| | GRASP DIRECTION | GRASP SURFACE |
|---|---|---|
| 1 | A | B-B' |
| 2 | A | C-C' |
| 3 | B | A-A' |
| 4 | B | C-C' |
| 5 | C | A-A' |
| 6 | C | B-B' |
| 7 | A' | B-B' |
| 8 | A' | C-C' |
| 9 | B' | A-A' |
| 10 | B' | C-C' |
| 11 | C' | A-A' |
| 12 | C' | B-B' |

FIG. 9

ARM -90 DEGREES

ARM 0 DEGREES

ARM +90 DEGREES

ROBOT CONTROLLER AND ROBOT SYSTEM

BACKGROUND

1. Technical Field

The present invention relates to a robot controller and a robot system.

2. Related Art

As industrial robots, robots having arms and hands are widely used. The industrial robots can grasp work using the arms and the hands and perform processing on the work.

In order to allow the industrial robot to perform an operation as intended by a user, it is necessary to teach jobs to be executed to the robot. In Patent Document 1 (JP-A-2009-214212), a method of presenting a grasp technique that can be applied to work as an object to the user and urging the user to select an appropriate grasp technique has been proposed. In the method of Patent Document 1, plural grasp techniques are presented in consideration of obstacles around or the like. Specifically, a hand-grasp model image is displayed in superimposition on a taken image of the work, and thereby, applicable grasp techniques are presented in a visually recognizable form.

Further, in Patent Document 2 (JP-A-2004-268161), a method of determining a grasp location without the need to re-grasp an object when moving the object within a living space has been proposed. Specifically, when work is handed over from the robot to a user, the robot does not grasp the part to be grasped by the user so that the user may easily grasp the work.

In the method of Patent Document 1, though the grasp techniques applicable to the work are presented, the final choice is up to the user. Further, in the method of Patent Document 2, the method is limited to the method for avoiding re-grasping when the work is handed over, and no efficient grasp techniques in other situations are proposed.

SUMMARY

An advantage of some aspects of the invention is to provide a robot controller, a robot system, etc. that can determine a grasp technique not to be an obstacle to the next operation or the like when grasping work according to preset jobs.

An aspect of the invention relates to a robot controller of a robot having an arm with a hand that can grasp work, and the robot controller includes an input unit that receives operation instruction information as information for instruction of an operation of the robot, a database that stores grasp pattern information as information describing an operation pattern when the hand grasps the work, and a processing unit that performs control processing of the robot based on information from the input unit and information from the database, wherein the input unit receives first to N-th (N is an integer number equal to or more than "2") operation instructions as the operation instruction information, the processing unit loads i-th grasp pattern information (i is an integer number equal to or more than "1" and equal to or less than "N−1") that enables execution of an i-th operation instruction and the j-th grasp pattern information that enables execution of the j-th operation instruction as the next operation instruction to the i-th operation instruction of the first to N-th operation instructions from the database, and performs control processing of the robot based on the i-th grasp pattern information and the j-th grasp pattern information.

In the aspect of the invention, the control processing of the robot is performed based on the i-th grasp pattern information that enables execution of the i-th operation instruction and the j-th grasp pattern information that enables execution of the j-th operation instruction. Accordingly, the control processing is performed using not only information in the current state but also information in the next state, and thus, a grasp technique not to be an obstacle to the next operation or the like can be determined.

In the aspect of the invention, the processing unit may perform control processing of the robot by selecting a combination of grasp patterns that enable sequential execution of the i-th operation instruction and the j-th operation instruction from an i-th group of grasp patterns represented by the i-th grasp pattern information and a j-th group of grasp patterns represented by the j-th grasp pattern information.

Thereby, as the control processing using the grasp pattern information, the combination of grasp patterns that enable sequential execution of the i-th operation instruction and the j-th operation instruction is selected, and thus, a grasp technique not to be an obstacle to the next operation or the like can be determined.

In the aspect of the invention, the i-th operation instruction may be an operation instruction of instructing grasping of the work, the j-th operation instruction may be at least one of an operation instruction of moving the grasped work and an operation instruction of changing a position of the grasped work, and the processing unit may perform control processing of allowing the robot to perform an operation corresponding to the i-th operation instruction and the j-th operation instruction by selecting the same one of the i-th group of grasp patterns represented by the i-th grasp pattern information and the j-th group of grasp patterns represented by the j-th grasp pattern information.

Thereby, in the case of a single-arm robot, a grasp technique not to be an obstacle to the next operation or the like can be determined by selecting the same grasp pattern.

In the aspect of the invention, given that a state of the work before grasping is a first state and a state of the work after moving or changing in position is referred to as a second state, the i-th group of grasp patterns may be a group of grasp patterns of grasping the work in the first state, the j-th group of grasp patterns may be a group of grasp patterns of grasping the work in the second state, and the processing unit may perform control processing of allowing the robot to perform an operation corresponding to the i-th operation instruction and the j-th operation instruction by selecting the same one of the i-th group of grasp patterns and the j-th group of grasp patterns.

Thereby, it can be clarified that in which state the work is when the work is grasped according to each grasp pattern information.

In the aspect of the invention, the i-th operation instruction may be an operation instruction of instructing grasping of the work with one hand of a first hand and a second hand of the robot, the j-th operation instruction may be an operation instruction of instructing performance of a switching operation of the work and grasping of the work with the other hand of the first hand and the second hand, and the processing unit may perform control processing of allowing the robot to perform an operation corresponding to the i-th operation instruction and the j-th operation instruction by selecting a grasp pattern that enables grasping with both hands of the first hand and the second hand at the same time from the i-th group of grasp patterns represented by the i-th grasp pattern information and the j-th group of grasp patterns represented by the j-th grasp pattern information.

Thereby, in the case of the so-called dual-arm robot, a grasp technique not to be an obstacle to the next operation or the like can be determined by selecting the grasp pattern that enables grasping with both of the two hands at the same time. Note that the robot may have three or more arms.

In the aspect of the invention, the database may store pattern information for identification of a direction of grasping and a surface of grasping as the grasp pattern information.

Thereby, the simple information on the direction of grasping and the surface of grasping as the grasp pattern information may be stored, and thus, reduction in processing load or the like may be realized.

In the aspect of the invention, the database may store hand identification information as information for identification of the hand and work identification information as information for identification of the work, and the processing unit may perform control processing of the robot based on the hand identification information and the work identification information.

Thereby, the control processing using information on the hand and the information on the work may be performed.

In the aspect of the invention, the processing unit may acquire the grasp pattern information that enables execution of the operation instruction specified by the operation instruction information based on the hand identification information, the work identification information, and the operation instruction information from the database.

Thereby, the grasp pattern information that enables execution of the operation instruction may be acquired from the hand identification information, the work identification information, and the operation instruction information.

In the aspect of the invention, the database may store at least one of hand size information and hand position information as the hand identification information, and stores at least one of work size information and work position information as the work identification information.

Thereby, the size information and the position information of the hand as the hand identification information may be stored, and the size information and the position information of the work as the work identification information may be stored.

In the aspect of the invention, the database may store arm identification information for identification of the arm, and the processing unit may perform control processing of the robot based on the hand identification information, the work identification information, and the arm identification information.

Thereby, control processing using the information on the arm in addition to the information on the hand and the information on the work may be performed.

In the aspect of the invention, the database may store at least one of length information of the arm and rotation information of the arm as the arm identification information.

Thereby, the length information and the rotation information of the arm may be stored as the arm identification information.

In the aspect of the invention, the robot controller may further includes a position information detection unit that detects position information of the work, and the processing unit may perform control processing of the robot based on the position information.

Thereby, the position information of the work may be detected, and processing on an appropriate part of the work or the like may be performed.

In the aspect of the invention, if plural grasp patterns are selected as grasp patterns that allow the robot to perform operations corresponding to the first to N-th operation instructions, the processing unit may perform processing of presenting the selected grasp patterns to a user.

Thereby, presentation of the selected plural grasp patterns to the user or the like may be performed.

Another aspect of the invention relates to a robot system including the robot controller according to the aspect of the invention, and a robot having the arm with the hand that grasps the work.

Still another aspect of the invention relates to a robot system including a robot having an arm with a hand that can grasp work, an input unit that receives operation instruction information as information for instruction of an operation of the robot, a database that stores grasp pattern information as information describing an operation pattern when the hand grasps the work, and a processing unit that performs control processing of the robot based on information from the input unit and information from the database, wherein the input unit receives first to N-th (N is an integer number equal to or more than "2") operation instructions as operation instruction information, and the processing unit loads the i-th grasp pattern information (i is an integer number equal to or more than "1" and equal to or less than "N−1") that enables execution of the i-th operation instruction and the j-th grasp pattern information that enables execution of the j-th operation instruction as the next operation instruction to the i-th operation instruction of the first to N-th operation instructions from the database, and performs control processing of the robot based on the i-th grasp pattern information and the j-th grasp pattern information.

BRIEF DESCRIPTION OF THE DRAWINGS

The invention will be described with reference to the accompanying drawings, wherein like numbers reference like elements.

FIG. 3 shows an example of a data structure stored in a database.

FIG. 9 shows a group of grasp patterns that enable execution of an operation instruction in the next state when the current state is not considered.

DESCRIPTION OF EXEMPLARY EMBODIMENTS

As below, an embodiment will be explained. The embodiment to be explained does not unduly limit the invention described in the appended claims. Further, all of the configurations to be explained in the embodiment are not necessarily essential structural elements of the invention.

1. Method of Embodiment

First, a method of the embodiment will be explained. As will be described later using FIG. 1, the embodiment relates to a robot controller of a robot having an arm and a hand (grasping part) provided at the end of the arm or the like. In the industrial robot, processing is performed on work (an object to be processed) placed on a palette or the like by operation of the arm and the hand. As specific examples of the processing, grasping, working, turning, moving, etc. may be assumed.

Figure 6:
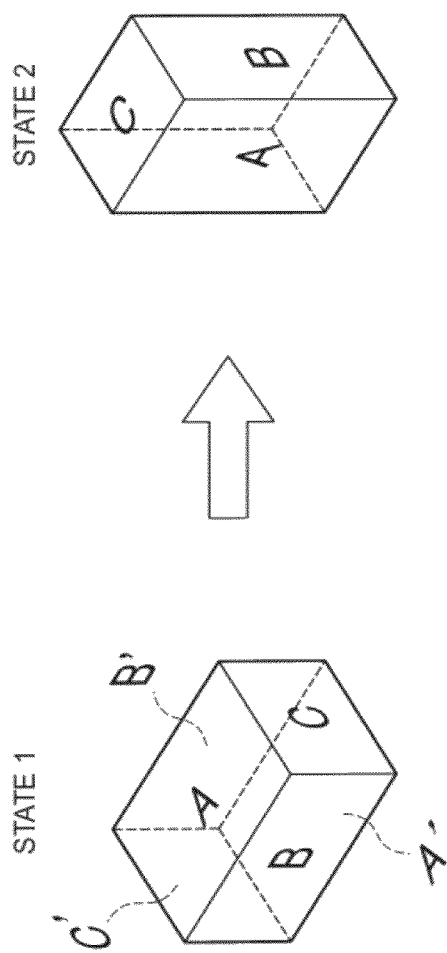
FIG. 6 is a diagram for explanation of a method of determining a grasp pattern of a two-step operation.

When allowing the industrial robot to perform processing, it is necessary to set a series of jobs (hereinafter, appropriately referred to as "scenario"). As an example of the scenario, as shown in FIG. 6, an example of grasping the work and placing it with a specific surface down may be assumed. In addition, a scenario of grasping the work with the right hand, switching it to the left hand, and attaching a component to a specific location of the work with the right hand may be assumed.

Figure 16A:
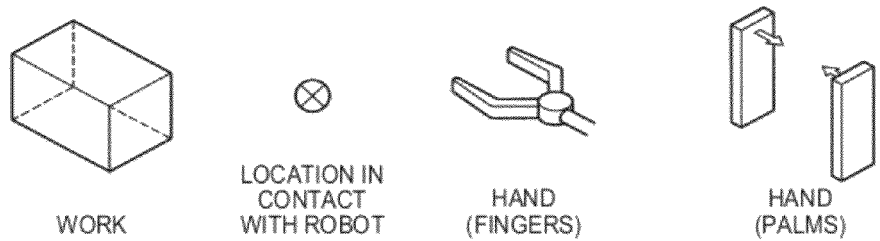
FIGS. 16A to 16G are diagrams for explanation of examples of possible patterns and impossible patterns when work is grasped.
Figure 16A:
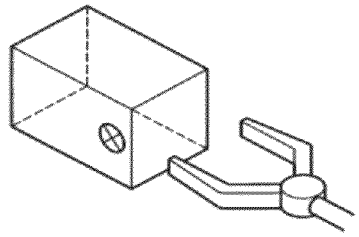
Figure 16B:
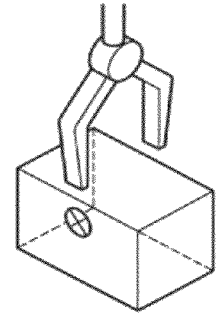
Figure 16C:
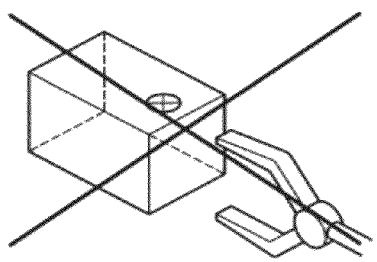
Figure 16D:
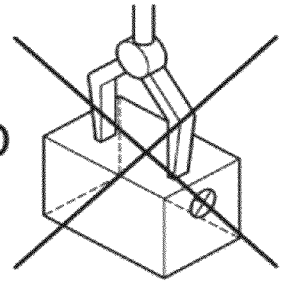
Figure 16E:
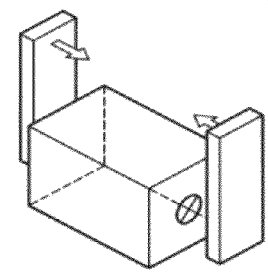
Figure 16F:
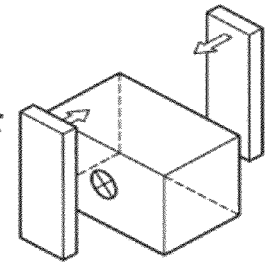
Figure 16G:
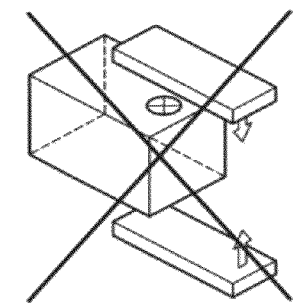

However, even when the scenario is set, it is hard to allow the robot to efficiently perform processing. For example, as a part of the above described scenario, when the job of grasping the work with the right hand is specified, various techniques of grasping the work may be considered. FIGS. 16A to 16G show the examples. The work may be grasped from the side as shown in FIG. 16A, or may be grasped from the top as shown in FIG. 16B. Further, when the work is grasped from the top, the center may be grasped, or the left end or the right end may be grasped. Note that FIGS. 16E and 16F show the examples using hands like palms, not fingers. Furthermore, FIGS. 16C, 16D, and 16G show the examples in which it is impossible to grasp the work because the floor becomes an obstacle or the length of the spread fingers is shorter than that of the work.

In order to efficiently perform processing on the work, it is necessary to select appropriate one of the plural grasp patterns (referring to operation patterns of the hand that enable execution specific operation instructions). That is, when the process shifts from a first operation instruction to a second operation instruction according to the scenario, there may be a grasp pattern to be an obstacle for execution of the second operation instruction among the grasp patterns that enable execution of the first operation instruction.

A specific example is shown using a scenario of grasping the work and placing it with another surface down. In this example, as described above, there are plural executable grasp patterns in combinations of grasp directions (side, top) and grasp locations (center, left end, right end) for the first operation instruction (grasping the work). However, in consideration of the example in which the upward surface in the original state is directed downward, if the work is grasped from the top, the grasping hand becomes an obstacle and it is impossible to execute the next operation instruction. That is, in this example, of the plural grasp patterns that enable execution of the first operation instruction, the pattern of grasping the work from the top becomes a factor for interruption of the efficient operation in execution of the second operation instruction. Specifically, it is necessary to insert a step, between grasping the work from the top and placing it with the upper surface downward, of re-grasping the work from the side or the bottom with the other hand (assuming a dual-arm robot). This is not preferable because it may cause changing of the preset scenario.

Accordingly, the applicant proposes a method of determining a grasp technique that may not become an obstacle for the next operation according to a scenario. In the above described example, in consideration of the second operation instruction, a grasp pattern (grasping from the top) to become an obstacle when the second operation instruction is executed is specified. Then, not all of the grasp patterns that enable execution of the first operation instruction, but patterns other than the patterns determined to be obstacles may be employed. That is, in the above described example, the grasp pattern of grasping the work from the side is employed. In this manner, it may be possible to allow the robot to efficiently perform operation according to the scenario without changing the scenario to insertion of the re-grasping operation or the like.

As below, a system configuration example will be explained, and a method of determining a grasp technique will be explained using a structure example of a database and a flowchart. Then, a specific method will be explained, and finally, a method of presenting a selected grasp pattern will be explained.

2. System Configuration Example

A configuration example of a robot system including the robot controller according to the embodiment will be explained using FIG. 1. The robot system includes an information processing device 10, an imaging device 20, and a robot 30. Note that the configuration of the robot system is not limited to the configuration in FIG. 1, however, various modifications of omitting some of the component elements and adding other component elements may be implemented. The robot 30 has an arm 320 and a hand 330, and performs processing according to operation instructions from the information processing device 10. For example, the robot performs processing on work placed on a palette 40. The imaging device 20 is provided in a location where the device can image the work (the device may be mounted immediately above the palette or on the hand 330 of the robot 30), for example, and mainly performs imaging of the work and detects information on the location, the position, or the like of the work from information of the taken image. The detected information may be sent to the information processing device 10 or the like, for example, or directly sent to the robot 30. Another method than the method of acquiring a taken image by the imaging device 20 (for example, three-dimensional scan using laser or the like) may be used because it is only necessary to detect the information on the location, the position, or the like of the work.

A specific configuration will be explained using FIG. 2. The information processing device 10 includes a storage unit 110, a processing unit 120, a display unit 150, and an external I/F unit 160.

The storage unit 110 stores databases and serves as work regions for the processing unit 120 etc., and its functions may be realized by a memory of RAM or the like, an HDD (hard disc drive), or the like. The storage unit 110 includes a work database 112 (hereinafter, the database is appropriately referred to as "DB") and a robot DB 114, and the robot DB 114 includes an arm DB 116 and a hand DB 118. If the robot has plural arms, there may be a plurality of the arm DB 116 and hand DB 118. The work DB 112 stores information on the size, the shape, the position, etc. of the work. The robot DB 114 stores data on the robot. Specifically, the shape, the movable range, etc. of the arm are stored in the arm DB 116, and information on the shape, the size, etc. of the hand is stored in the hand DB 118. Note that the configuration of the storage unit 110 is not limited to the configuration in FIG. 2, however, various modifications of omitting some of the component elements and adding other component elements may be implemented.

The processing unit 120 performs various kinds of processing based on data from the storage unit 110, information from the imaging device received in the external I/F unit 160 or the like, or the robot. The functions of the processing unit 120 may be realized by hardware of various processors (CPU etc.), ASIC (gate array etc.), or the like or programs.

The processing unit 120 includes a work location computing part 122, an image processing part 126, and a grasp pattern information acquiring part 128. The configuration of the processing unit 120 is not limited to the configuration in FIG. 2, however, modifications of omitting some of the component elements and adding other component elements may be implemented. The work location computing part 122 computes the location of the work. For example, the part computes the location of the work using data acquired from the imaging device 20 in the external I/F unit 160. The image processing part 126 acquires taken image information from the imaging device 20 and performs various kinds of image processing thereon. Note that, here, the image processing part 126 is provided in the processing unit 120 of the information processing device 10, however, not limited to that. The image processing part may be provided in the imaging device 20. The grasp pattern information acquiring part 128 acquires grasp pattern information that enables execution of operation instructions according to the information stored in the database of the storage unit 110. The specific groups of acquired grasp patterns will be described later.

The display unit 150 displays various display screens, and may be realized by a liquid crystal display, an organic EL display, or the like, for example.

The external I/F unit 160 is an interface for performing input from the user to the information processing device 10 etc. and receiving information from the imaging device 20 and the robot 30. For the input from the user etc., the unit may include a switch, a button, a keyboard, a mouse, or the like.

As described above, the imaging device 20 is provided in the location where the device can image the work, and mainly performs imaging of the work. In the embodiment, the taken image information is sent to the information processing device 10 without change, however, not limited to that. For example, part of the processing unit 120 (for example, the image processing part 126 or the like) of the information processing device 10 may be provided to the imaging device 20. In this case, the information of image-processed taken images may be output.

Further, the robot 30 includes a control unit 310 in addition to the arm 320 and the hand 330. The control unit 310 receives the information from the information processing device 10 and performs control of the respective parts (the arm 320, the hand 330, etc.) of the robot.

3. Method of Determining Grasp Technique

Next, a method of determining a grasp technique (grasp pattern) will be explained. Specifically, a data structure example of the database stored in the storage unit 110 will be shown, and a flow of processing will be explained using a flowchart.

3.1. Database Examples

A data structure example of the database stored in the storage unit 110 will be explained using FIG. 3. Here, the database contains six tables, however, not limited to that. For example, here, information on the arm is not described, however, the database may contain the arm DB (database) 116 as has been explained in FIG. 2.

As shown in FIG. 3, the tables include a hand table, a hand state table, a work table, a work state table, a grasp pattern table, and an executable grasp pattern table. The hand table contains a hand ID and a hand shape, and the hand ID is a main key. The hand state table contains a hand state ID, a hand ID, and a hand position, and the hand state ID is a main key. The work table contains a work ID and a work shape, and the work ID is a main key. The work state table contains a work state IS, a work ID, and a work position, and the work state ID is a main key. The grasp pattern table contains a grasp pattern ID, a work state ID, and a hand state ID, and the grasp pattern is a main key. The executable grasp pattern table contains an executable grasp pattern ID, a grasp pattern ID1, and a grasp pattern ID2, and the executable grasp pattern ID is a main key.

Subsequently, the respective tables will be explained. The hand table holds information on the size, the shape, the movable range, the transportable weight, etc. of the hand. Here, for simplicity, only the shape information is held, however, information that is uniquely determined when the hand is determined may be added. The hand state table holds information on the state of the hand. Here, for simplicity, the information is unified as position information, however, the position may be further divided. Representative position information is on location and orientation of the hand itself and opening and closing states of the hand. Which hand is in which hand position may be known from the hand state table.

Further, the work table holds information on the size, the shape, etc. of the work. The details basically depend on the hand table, however, information for determination as to whether or not a hand of interest may grasp work such as a weight or a coefficient of friction of the surface may be necessary. In the embodiment, for simplicity, information on only the size and the shape is held. The work state table holds information on the state of the work to be processed. Which work is grasped or placed in which position or the like may be known.

The grasp pattern table specifies a grasp pattern corresponding to a certain operation instruction. The grasp pattern refers to an operation pattern of the hand that enables execution of a specific operation instruction as described above, however, various description methods are considered for the operation pattern of the hand. Here, description of the operation pattern according to the position information of the hand is explained. The position information is information on representative location coordinates of the hand, a rotation angle from the reference position, or the like, for example. Or, the information may be information on a grasp direction and a grasp surface as will be described later using FIG. 6. Further, work state information is used as information corresponding to the operation instruction. That is, the operation instruction is, for example, an instruction of "grasping work placed with surface A down" and "placing work with surface C down", and, if the operation instruction is determined, the state of the work may be determined such that "placed with surface A down" or "placed with surface C down". According to the configuration, the grasp pattern can be described by connecting the work state ID and the hand state ID. Specifically, information on which hand is used and which work is grasped in which hand position and which work position may be held.

The grasp pattern table holds a specific operation instruction (specifically, a work state corresponding to an operation instruction) and a hand position that enables execution of the operation instruction. Accordingly, the method of the embodiment of selecting the grasp pattern that does not hinder the next operation may not be realized only by that. Therefore, the executable grasp pattern table is prepared. The executable grasp pattern table is a table that connects a grasp pattern corresponding to the i-th operation instruction (corresponding to the grasp pattern ID1) and a grasp pattern corresponding to the j-th operation instruction next to the i-th operation instruction (corresponding to the grasp pattern ID2). Combinations of states smoothly transferred from the i-th hand state and the work state determined by the grasp pattern ID1 to the j-th hand state and the work state determined by the grasp pattern ID2 may be stored as elements of the table.

Note that the data structure example of the database is not limited to that as described above. For example, in the above described example, the information on the operation instruction is specified by the work state, however, an operation instruction table may be prepared and independently handled.

3.2. Flowchart

Figure 4:
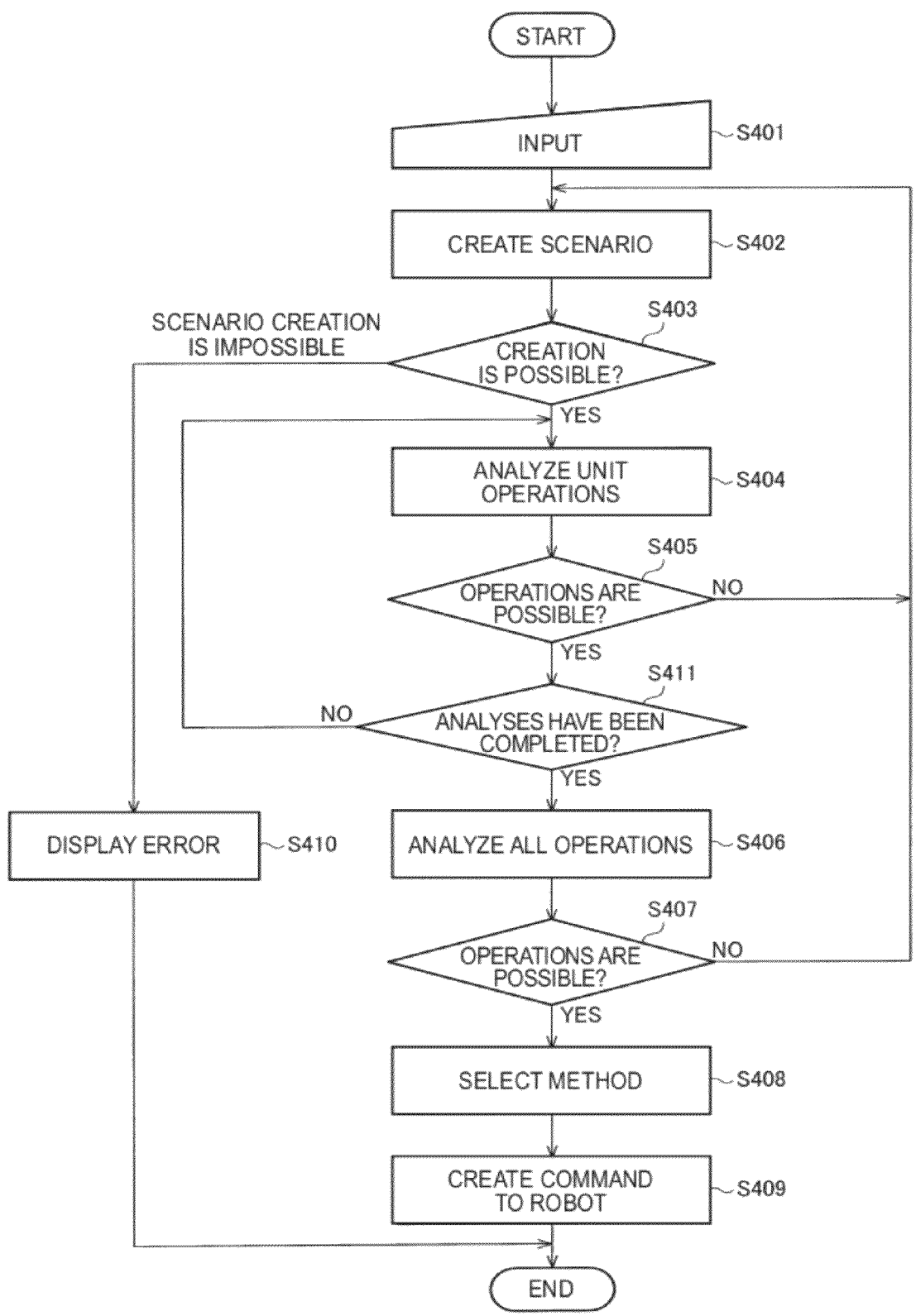
FIG. 4 is a flowchart for explanation of processing of the embodiment.
Figure 5:
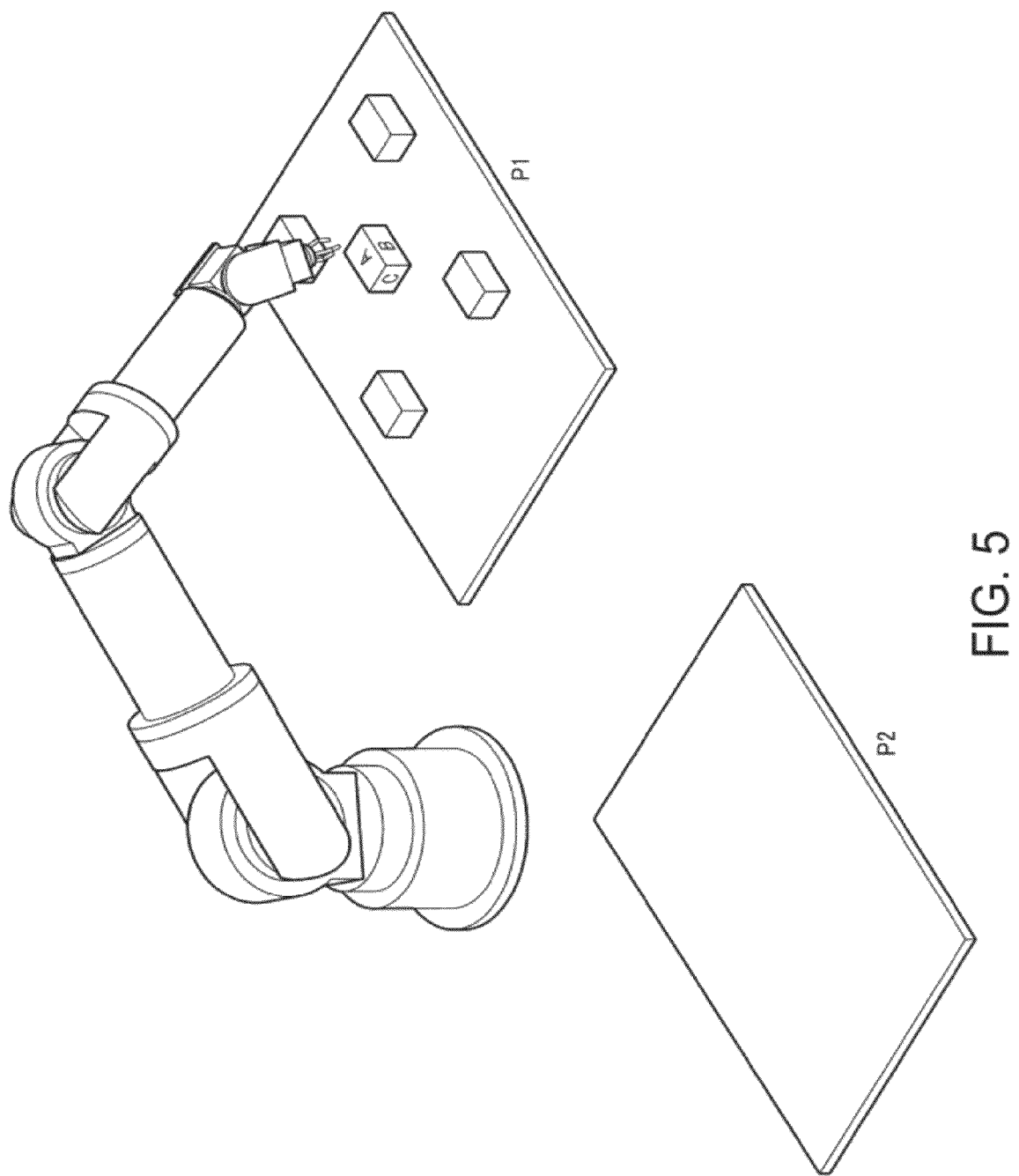
FIG. 5 shows a specific example of a situation used for the explanation of the flowchart.

The details of the processing will be explained using a flowchart in FIG. 4. Note that, as shown in FIG. 5 as a specific example, the example of a single-arm robot of moving work in a place P1 to a place P2 with surface C down is used, however, the processing of the flowchart in FIG. 4 is not limited to the specific example.

When the processing is started, first, input from a user is received (S401). Specifically, for example, input such as "place work in place P1 into place P2 with surface C down" is assumed. Then, creating processing of a scenario is started in response to the input (S402), and whether or not the creation is possible is performed (S403). For example, as the scenario, a scenario of (1) confirming a state of the work, (2) grasping the work with a hand, and (3) placing the work in the place P2 with the surface C down is assumed. If the creation is impossible at S403, an error message is displayed and the processing is ended (S410).

If the scenario creation is possible at step S403, the input is dissolved into unit operations and analyzed (S404), and determination as to whether or not the operations are possible is performed (S405). Specifically, regarding the above described step of (2) grasping the work with the hand, determination as to whether or not the place P1 is within a movable range of the arm, whether or not grasping of the work is possible depending on the shapes and the sizes of the hand and the work, etc. is performed. Then, determination as to whether or not the analyses of all unit operations have been completed is performed (S411), and, if the analyses have not been completed, then, and analysis of the next unit operation is performed and, if the analyses have been completed, the process moves to step S406. Further, if the determination that the operations are impossible is made at step S405, the process returns to S402 and a scenario is recreated.

Next, whether or not the analyses of all operations have been performed and there is inconvenience in the flow of the operations is confirmed (S406). If the operations are possible, the process moves to S408 and, if the operations are impossible, the process returns to S402 and a scenario is recreated. At step S408, if plural candidates of grasp patterns are left, a grasp pattern to be presented is selected. Then, a command to the robot 30 is created and sent (S409).

An example of addressing the case where the determination that the operations are impossible is made as a result of the unit operation analyses at S405 will be explained. For example, if the place P1 or the P2 is far and beyond the reach of the arm, the scenario is changed to a scenario of using the other hand in the case of a dual-arm robot. Further, if both P1 and P2 are beyond the reach of only the right hand or the left hand, the scenario is changed to a scenario of using the other hand in the middle. If the work is too large to grasp with a single hand, the scenario may be changed to a scenario of holding the work with the palms of the hands and lifting it.

4. Specific Techniques

Subsequently, specific techniques will be explained. Here, six examples will be explained, but, obviously, not limited to them.

4.1 Two-Step Example

First, as an example in which a scenario is executed at two steps, an example of grasping a rectangular parallelepiped and placing it with another surface down will be explained using FIG. 6. In this case, the scenario includes two steps of (1) grasping work in state 1 and (2) changing an orientation of the grasped work and placing it with a surface C' down.

Figure 7A:
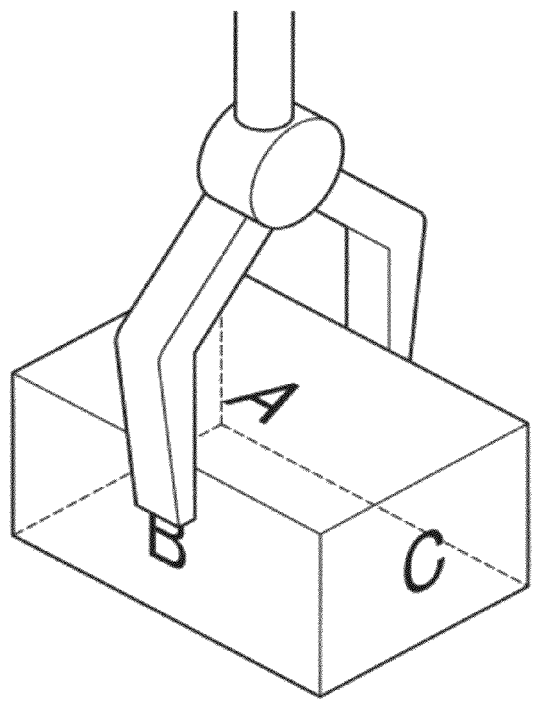
FIGS. 7A and 7B are diagrams for explanation of techniques of grasping work in a rectangular parallelepiped shape.

Here, for simplicity, the size of the work is as small as the size of the hand. That is, when B-B' is grasped from the surface A side as shown in FIG. 7A, plural grasp locations such as the center, the left end, and the right end are not considered.

Figure 7B:
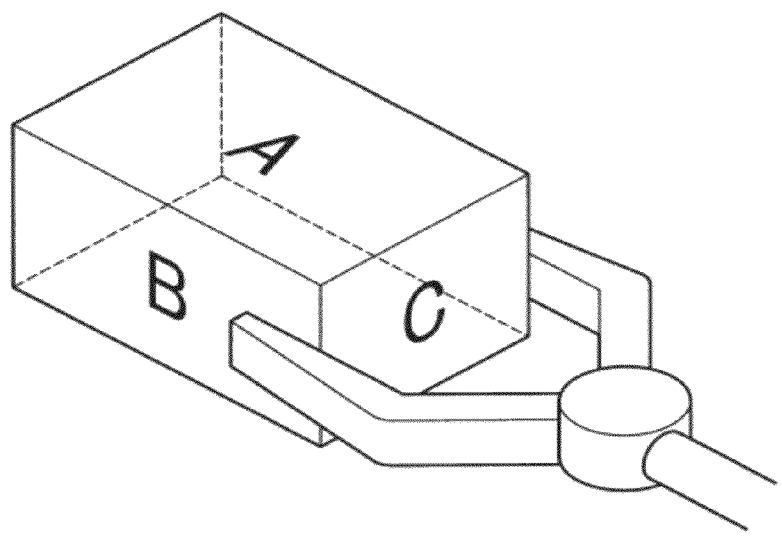

Under the above described condition, a group of grasp patterns executable in the state 1 (the work is placed with the surface A' down) include six patterns of a pattern of grasping B-B' from surface A (FIG. 7A), a pattern grasping C-C' from surface A, a pattern grasping C-C' from surface B, a pattern of grasping B-B' from surface C (FIG. 7B), a pattern grasping C-C' from surface B', and a pattern of grasping B-B' from surface C' as shown in FIG. 6. That is, the patterns with the hand at the surface A' side are excluded.

Similarly, a group of grasp patterns executable in the state 2 (the work is placed with the surface C' down) include six patterns of a pattern of grasping B-B' from surface A, a pattern grasping A-A' from surface B, a pattern grasping B-B' from surface A', a pattern of grasping A-A' from surface B', a pattern grasping B-B' from surface C, and a pattern of grasping A-A' from surface C as shown in FIG. 6. That is, the patterns with the hand at the surface C' side are excluded.

The group of grasp patterns to be employed in practice enable grasping in the state 1 and enable grasping in the state 2. That is, it is necessary to select a pattern that appears in common between the group of grasp patterns executable in the state 1 and the group of grasp patterns executable in the state 2. Specifically, the pattern of grasping B-B' from surface A and the pattern of grasping B-B' from surface C may be left.

Note that, as described above, there may be plural selectable grasp patterns. In this case, the selectable grasp patterns may be presented for the user to select, or the control system may select and execute an arbitrary grasp technique from the selectable grasp techniques.

4.2 Three-Step Example

Next, as an example in which a scenario is executed at three steps, an example of grasping a rectangular parallelepiped with the right hand and changing its orientation by switching it to the left hand will be explained.

Here, for simplicity, the explanation will be made assuming that the size of the work is as small as the size of the hand, and there is no room for insertion of the other hand on the surface being grasped by one hand. That is, it is impossible to grasp B-B' (or A-A') from surface C with the left hand at the same time when grasping B-B' from surface A with the right hand as shown in FIG. 7A.

Figure 8:
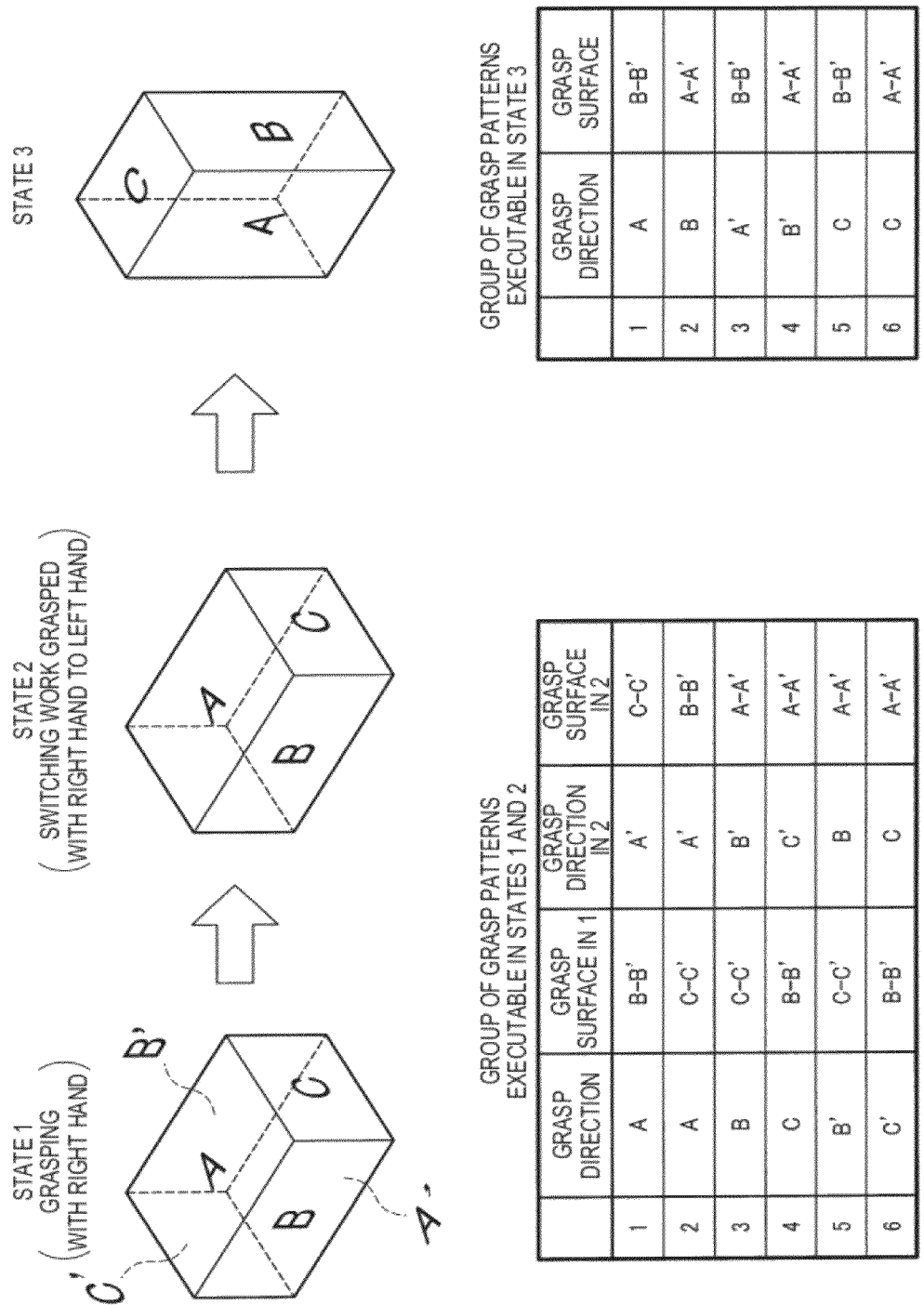
FIG. 8 is a diagram for explanation of a method of determining a grasp pattern of a three-step operation.

Under the above condition, a group of grasp patterns executable in the state 1 include six patterns like the two-step example. Further, a group of grasp patterns executable in state 3 include six patterns as shown in FIG. 8 like the two-step example.

Figure 10:
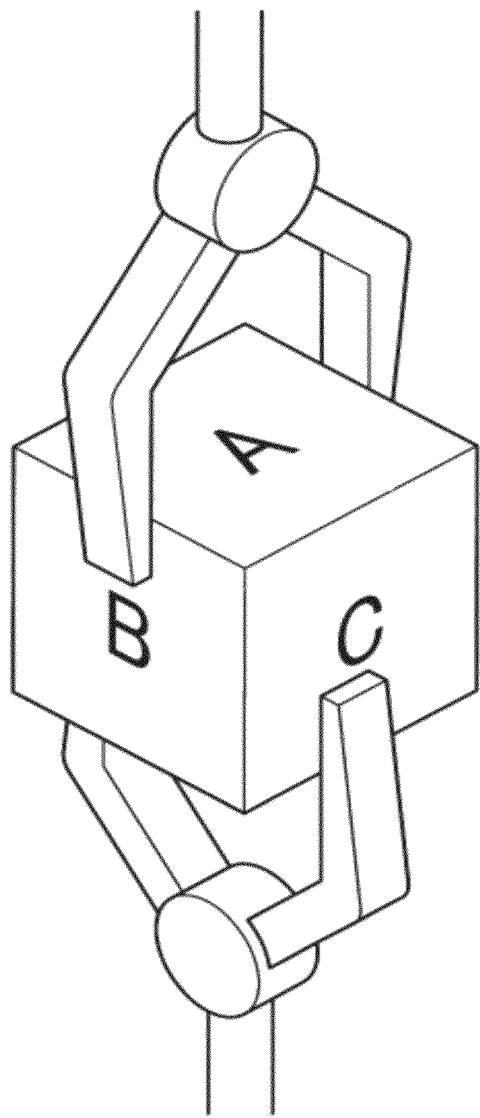
FIG. 10 shows an example of a grasp pattern that enables grasping work with two hands at the same time.

Here, a group of grasp patterns executable in the state 2 are considered. If the situation that the work has been already grasped with the right hand is not considered, as shown in FIG. 9, a group of 12 grasp patterns in total including patterns with six surfaces to be in the grasping orientations and two grasp surfaces for the respective orientations are assumed. However, as described above, the work has been already grasped with the right hand, not all patterns may be taken because the right hand becomes an obstacle. Specifically, as shown in FIG. 10, in the case where B-B' is grasped from surface A with the right hand, there is only one executable grasp pattern of grasping C-C' from surface A' with the left hand. That is, the group of grasp patterns executable in both the state 1 and the state 2 are limited to the six patterns as shown in FIG. 8. By selecting a common pattern between those six patterns and the six patterns of the group of grasp patterns executable in the state 3, an efficient three-step operation can be performed.

Note that the common pattern is selected by comparison between the part corresponding to the state 2 of the grasp patterns executable in the state 1 and the state 2 and with the grasp patterns executable in the state 3. For example, determination that the part (B', A-A') of the third grasp patterns (B, C-C', B', A-A') in the state 1 and the state 2 and the part of the fourth part (B', A-A') in the state 3 are common is made. As a result, the operation of grasping C-C' from surface B with the right hand in the state 1, switching to grasping of A-A' from surface B' in the state 2, and placing the work with the surface C' down as it is, for example, is selected.

As described above, when switching from one hand to the other hand is performed, the common grasp pattern between the state 1 and the state 2 is not selected, but the grasp pattern that enables grasping with two hands at the same time is selected. On the other hand, in the case where the work remains grasped with one hand (for example, the case where the work is grasped and placed with another surface down or the like), the common grasp pattern is selected.

Note that processing can be performed in the same manner if the number of steps is four or more. In this case, processing is sequentially performed from the state 1 so that the group of grasp patterns in the state 1 may be acquired, the group of grasp patterns in the state 2 may be selected in consideration of the state 1, and the group of grasp patterns in the state 3 may be selected in consideration of the state 2. Further, the final state may be acquired and the group of grasp patterns in the previous state may be selected in consideration of the posterior state in the inverse order.

Also, in the three-step case, plural selectable grasp patterns may be assumed as described above. In this case, the selectable grasp patterns may be presented for the user to select, or the control system may select and execute an arbitrary grasp technique from the selectable grasp techniques.

4.3 Technique not for Causing Collision Between Hands

Figure 11:
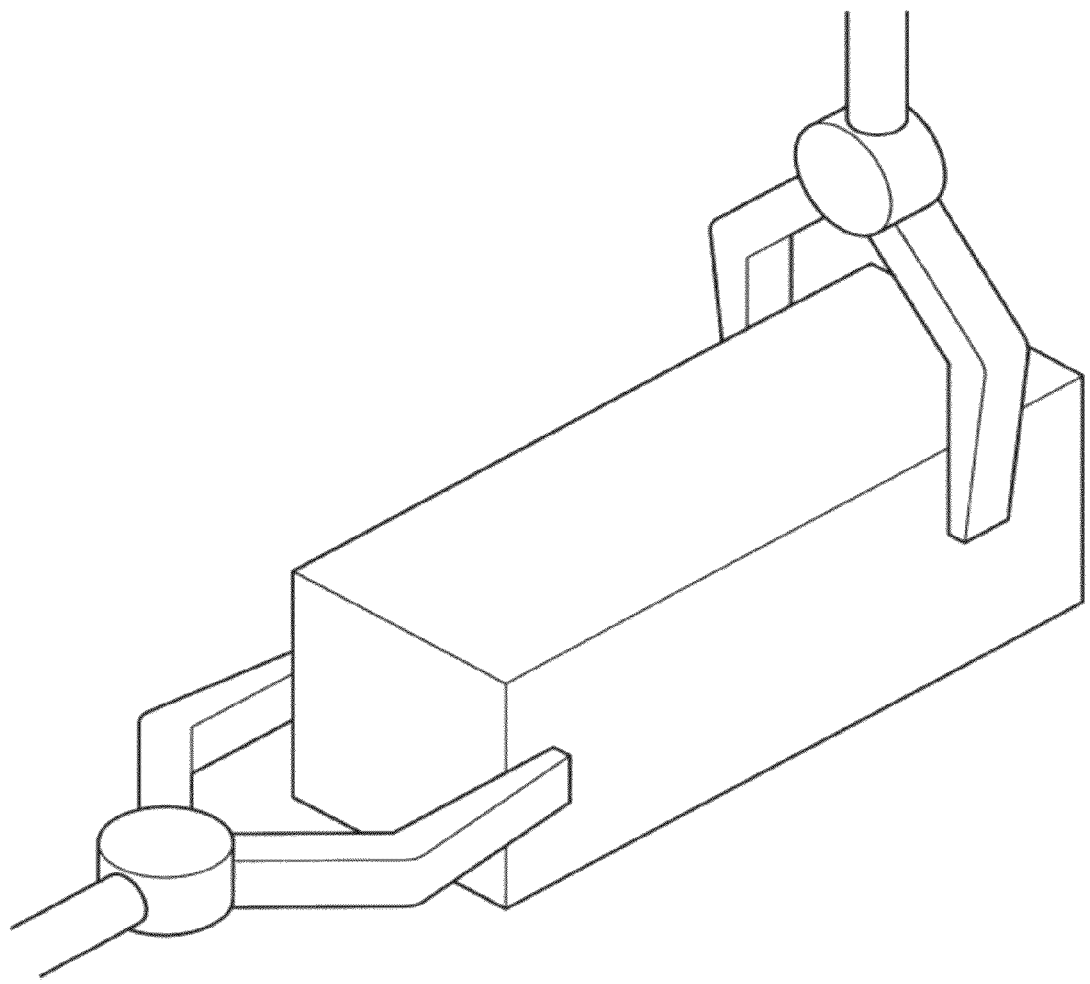
FIG. 11 is a diagram for explanation of a method of determining a grasp pattern in consideration of a collision between two hands.

Next, a technique not for causing collision between hands will be explained using FIG. 11. As shown in FIG. 11, in a dual-arm robot, an operation of switching the work grasped by one hand to the other hand may be performed.

Here, unlike the above described example, if the work is larger in size than the hand, plural grasp locations of the work are assumed such as the center, one end, and the other end. That is, when switching between the plural hands is performed, it is necessary that the following operations are considered.

(1) Information on the size, the movable range, the possible operation, etc. of the hand is acquired from the database.

(2) Information on the size, the possible grasp technique, etc. of the work is acquired from the database.

(3) Current state information is acquired based on the taken image from the imaging device 20.

(4) A possible grasp technique is determined based on the information of (1) to (3).

In the above described (4), specifically, it is necessary to check whether or not the location of the hand can be changed while the grasp direction and the grasp surface are maintained, whether or not the hand becomes an obstacle when the other hand grasps the work in that case, and the like based on information on the shape, the position of the center of gravity, or the like of the work.

In this manner, for example, as shown in FIG. 11, if the work is grasped by a hand 1, determination that it is impossible to grasp the part near the hand 1 but possible to grasp the other side of the work may be made.

4.4 Constraints by Arm Lengths

Figure 12A:
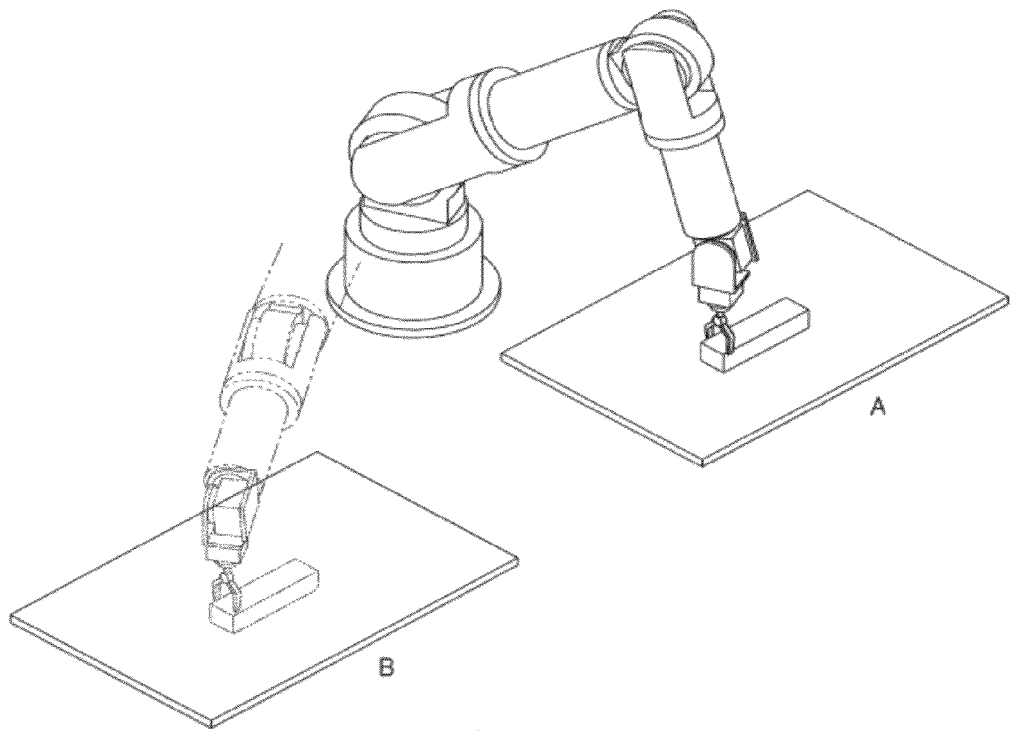
FIGS. 12A and 12B show examples in which grasp patterns are limited by constraints of arm lengths.
Figure 12B:
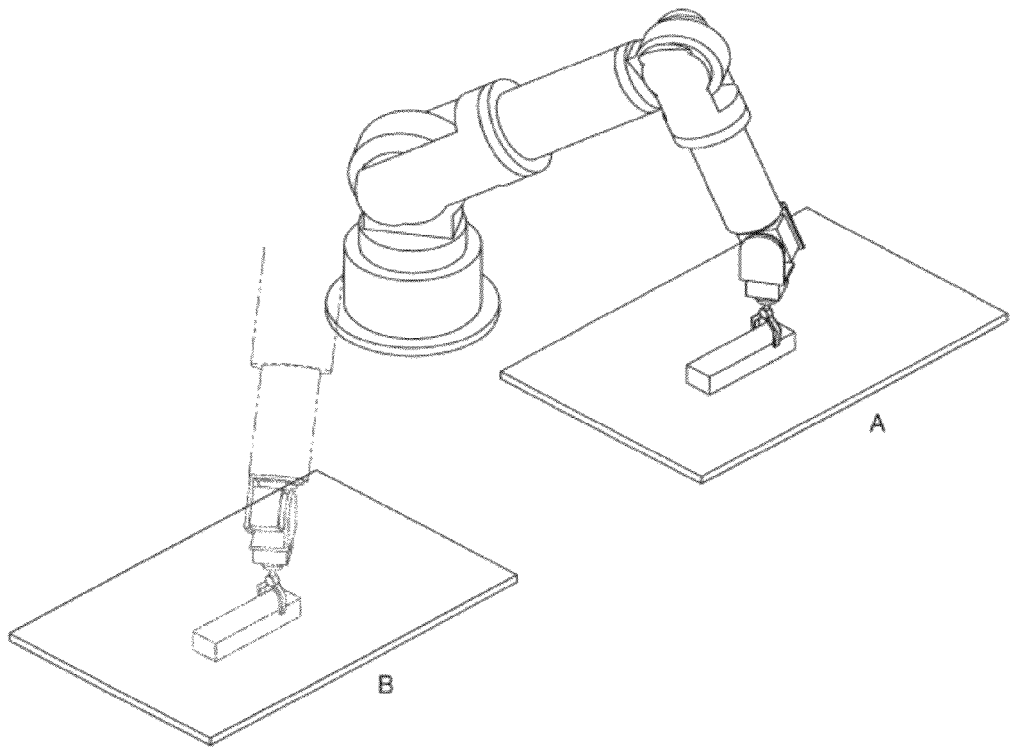

Next, limitation of the grasp patterns by constraints of arm lengths will be explained using FIGS. 12A and 12B. As shown in FIGS. 12A and 12B, an operation of grasping the work in region A and placing it in region B is assumed. In this case, working or the like may be performed after the work is grasped, and this is not particularly described here. Further, when the work is placed in the region B, the placement orientation and location are determined.

Under the above described condition, plural grasp patterns are assumed when the work in the region A is grasped. In this regard, if the positional relationship is as shown in FIGS. 12A and 12B, it is natural to grasp the point at the shorter distance in the region A as shown in FIG. 12A. However, in the state, if the work is moved to the region B, the distance from the location where the robot is disposed when the work is placed in the region B becomes longer as shown in FIG. 12A. According to the circumstances, it may be impossible to place the work in a specified orientation due to the limitation of the length of the arm 320 of the robot 30. Accordingly, the point as shown in FIG. 12B, which seems disadvantageous in grasping in the region A, is grasped. In this manner, as a result, the location at the shorter distance is grasped in the region B, and the operation can be performed without being affected by the constraint of the arm length. That is, it is necessary to consider not only the work and the hand 330 but also the arm 320 as elements for limiting the group of executable grasp patterns.

That is, according to the technique of the embodiment, the work can be grasped by the technique, which is apparently unreasonable as a grasp pattern in a certain state. In the above described example, when the work in the region A is grasped, the location farther from the robot may be grasped. Usually, in the technique without consideration of the next state, selection of a grasp pattern thought to be appropriate in the current state is assumed. Accordingly, if it is possible to select the plural grasp patterns, for example, a grasp pattern in which the moving distance and the rotation angle of the arm (or the hand) of the robot are smaller is preferentially selected (the priority of the selection is not limited to that by the determination method according to the moving distance or the like).

Conversely, it is difficult to select a grasp pattern, which is thought to be unreasonable in the current state, in the technique in related art. Accordingly, it is impossible to select the grasp pattern shown in FIG. 12B, and, as a result, the hand and the arm in the next state take unnatural forms as shown in FIG. 12A (realization may be impossible according to the situations). That is, according to the method in related art, though the local optimum solution may be obtained, the solution may not be optimum in consideration of the upstream and downstream flow in many cases. In the method of the embodiment, the optimum grasp pattern in the upstream and downstream flow is selected regardless of the local optimum solution, and the method is more advantageous than the method in related art in that.

4.5 Constraints by Rotation of Arm

Figure 13:
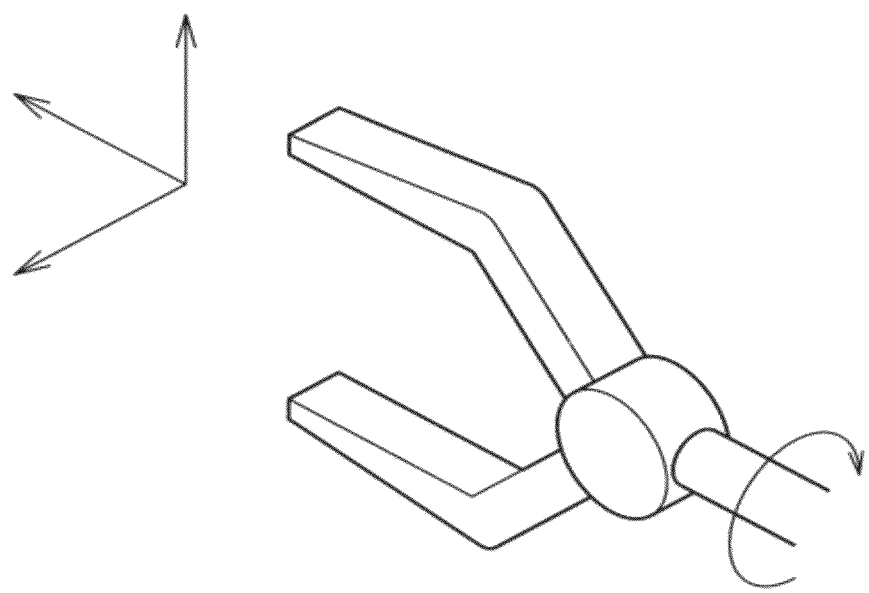
FIG. 13 shows an example of a coordinate system set for an arm.
Figure 14A:
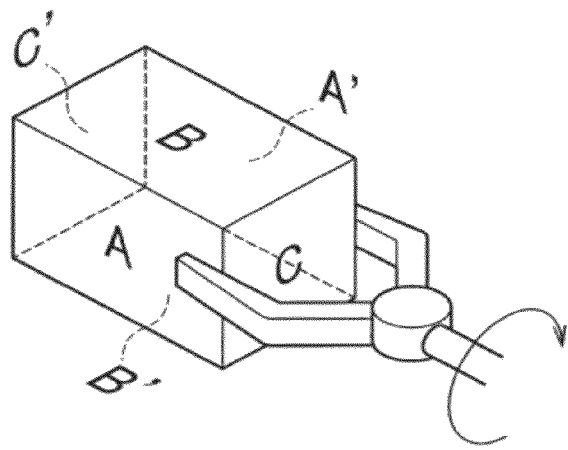
FIGS. 14A to 14C show examples in which grasp patterns are limited by constraints of rotatable ranges of arms.
Figure 14B:
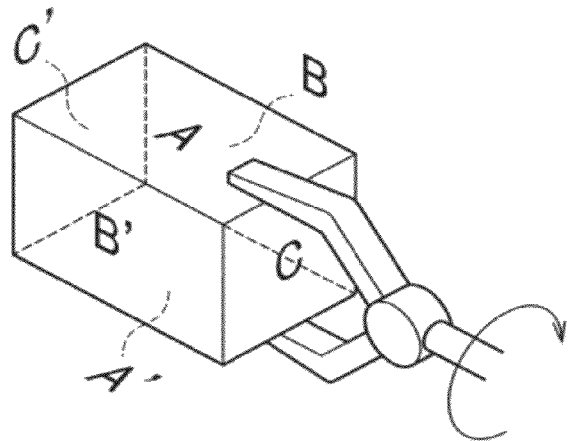
Figure 14C:
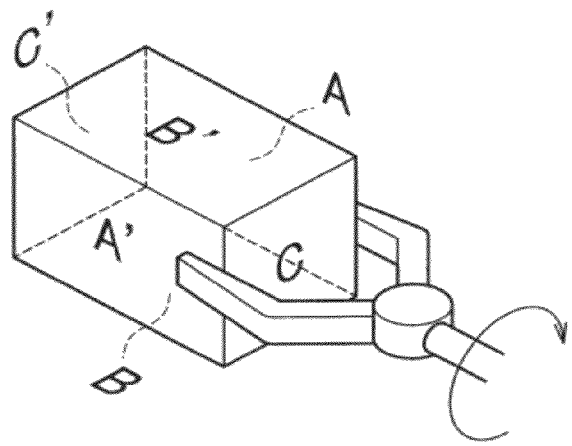

Next, constrains by rotation of the arm will be explained. As shown in FIG. 13, a coordinate system of the arm 320 is set, and the state in FIG. 13 is 0°, the direction in an arrow is rotation in a positive direction, and the rotation angle of the arm 320 is from −180° to 180°. Further, as shown in FIGS. 14A to 14C, an operation of grasping work having a rectangular parallelepiped shape along A-A' from surface C and rotating it clockwise (in the positive direction) to 180° as seen from the direction of the arm is considered.

In this case, to grasp the work in the initial state, it is necessary to rotate the arm 320 to +90° or −90° and grasp it. However, in the case where the work is rotated to +90° and grasped, the angle reaches the limit value when the work is rotated to 90° from there, and it becomes impossible that the work is rotated to 180° in the positive direction. Accordingly, even when two grasp techniques are assumed in the initial state, it is necessary that the work is rotated to −90° and grasped due to the constraints of the rotation angle of the arm 320. Therefore, it is known that there is necessity to consider not only the constraints of the arm length but also the rotation angle in regard to the constraints by the arm 320.

According to the method of the embodiment, for the group of grasp patterns having the same priority when only the current state is considered, different priorities can be given. In the above described example, when only the current state is considered, in both of the grasp patterns of +90° and −90°, the rotation angle of the arm is 90°, and, if determination is made based on the magnitude of the rotation angle or the like, it is impossible determination which is more appropriate is made. However, according to the method of the embodiment, in consideration of the next state, it is possible determination that −90° is more appropriate than +90° is made.

4.6. Constraints by Hand Itself

Figure 15A:
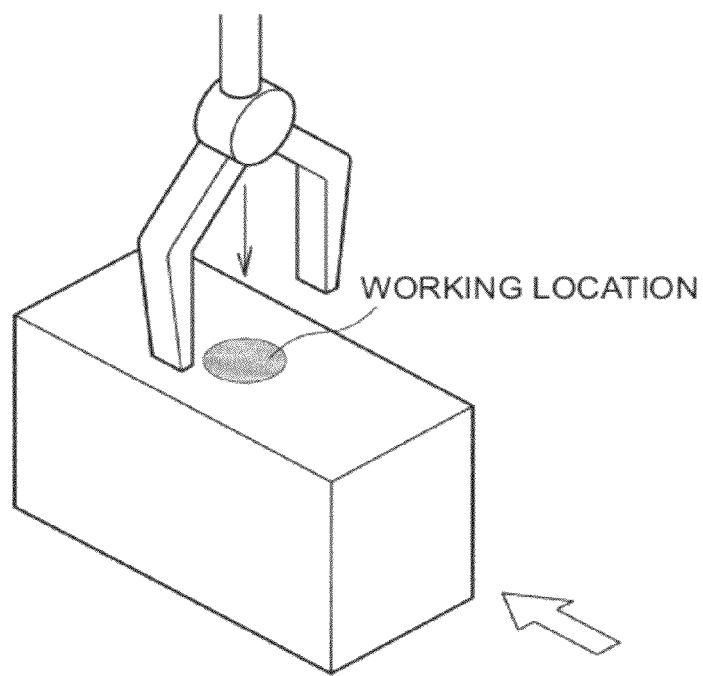
FIGS. 15A and 15B show examples in which grasp patterns are limited by constraints of hands themselves.

Further, the hand itself may become an obstacle. For example, as shown in FIG. 15A, in the case where the upper surface is worked at the subsequent step, if the work is grasped from the top, the hand becomes an obstacle and working is impossible. In this case, the work is grasped from the side surface.

Figure 15B:
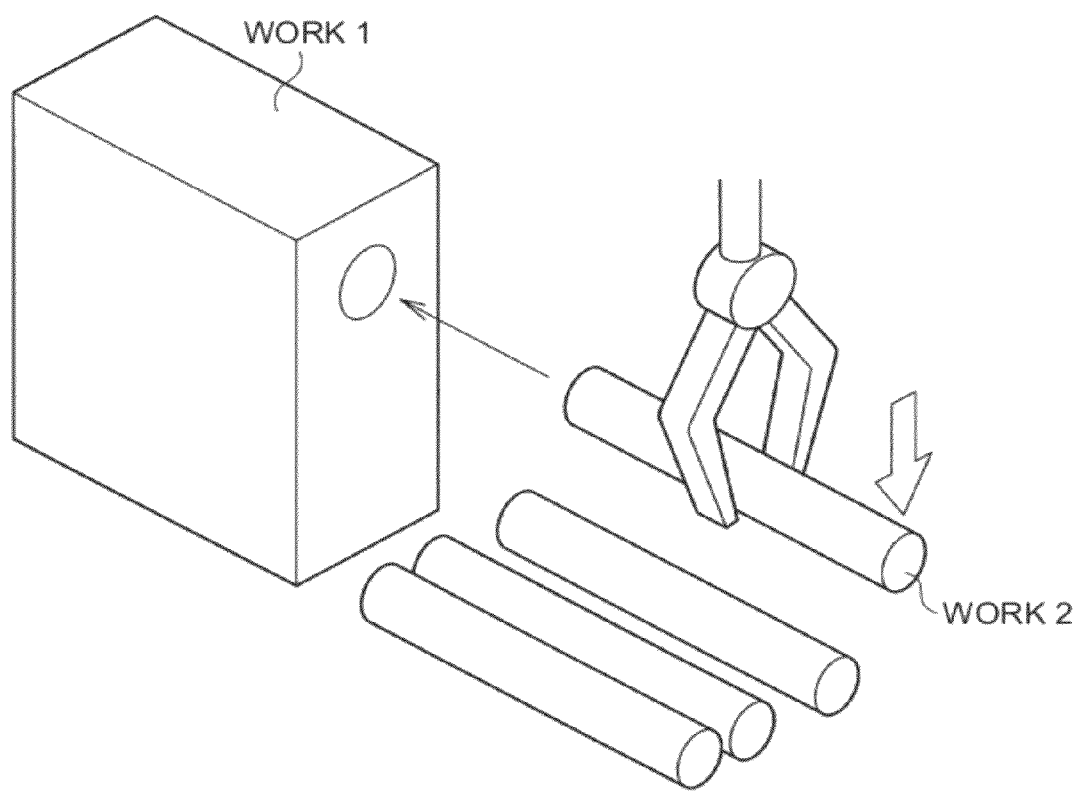

Furthermore, as shown in FIG. 15B, when rod-like part work 2 is inserted into the hole of the work 1, even if the center of the work 2 is grasped, insertion is impossible because the hand itself collides with the work 1. In this case, the end of the work 2 is grasped.

In this regard, when only the current state is considered as described above, the technique that is apparently unreasonable can be selected. In the case of FIG. 15A, compared to the case where the work is grasped from the upper surface, in the case where the work is grasped from the side surface, balance becomes poor and the grasping force should be made larger from the relationship with the position of the center of gravity. In the related art method, it has been difficult to daringly select the grasp pattern, however, the selection becomes possible in the method of the embodiment. Further, in FIG. 15B, similarly, grasping of the end is grasping of the location apart from the center of gravity and the grasping force should be made larger, and thus, to employ the grasp pattern, it is necessary to use the method of the embodiment.

5. Presentation Method

In the above described method of selecting the group of grasp patterns, it may be possible that plural grasp patterns are finally selected. In this case, for example, a method of selecting the optimum grasp pattern according to the operation of the arm 320 is assumed. Specifically, a pattern of grasping a location in a shorter distance requiring less movement or a pattern in which a joint moves to a smaller angle is selected. Or, a pattern using a position in which any unnecessary force is not applied to the arm or a position with higher operation accuracy may be selected.

Further, as a result, if there is no operable grasp pattern, for example, an error is returned to the user. In addition, changes of scenarios such as increase in the number of times of switching and grasping with another hand may be proposed. Furthermore, the changes of scenarios may automatically be performed after notification to the user.

Figure 2:
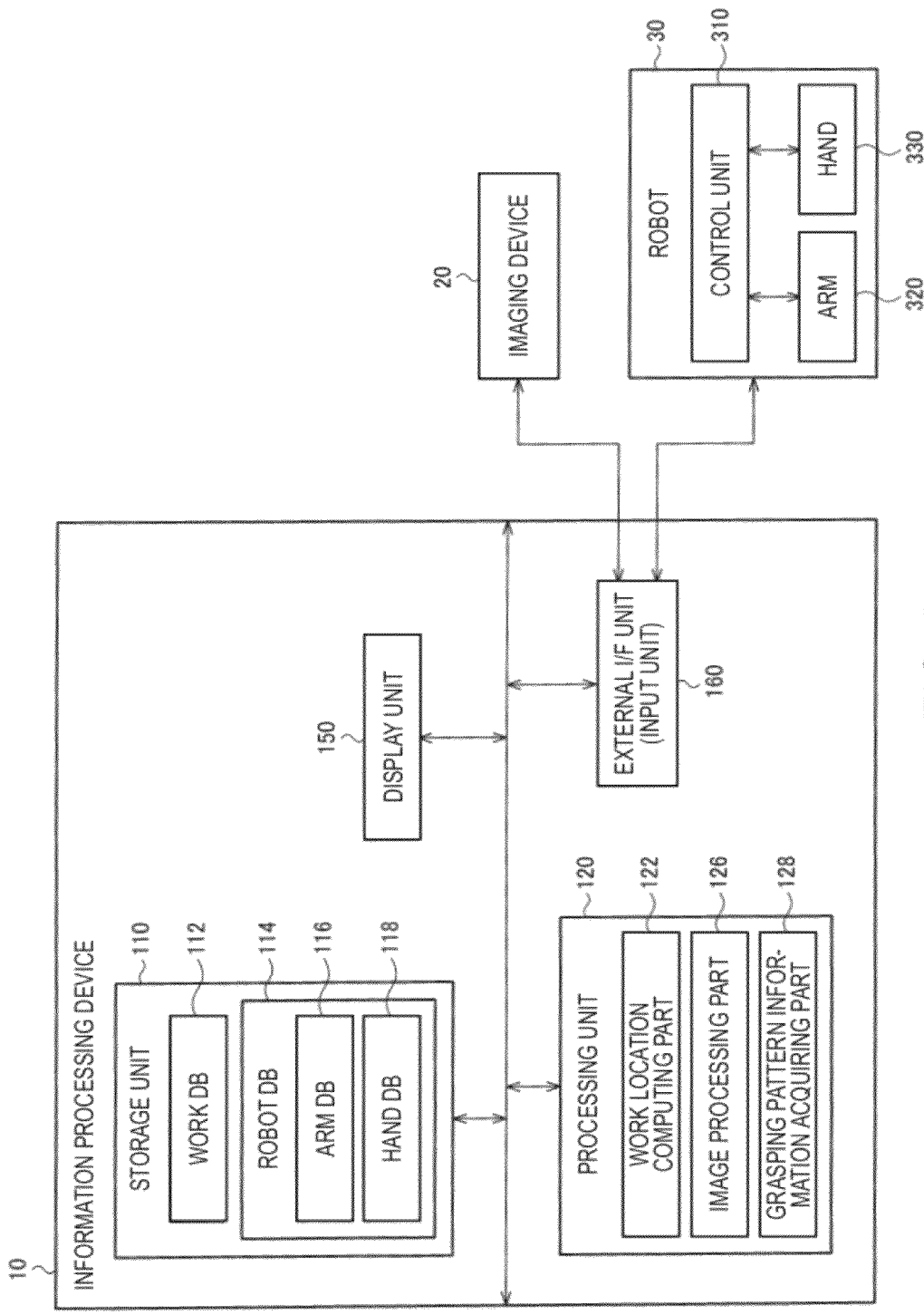
FIG. 2 shows a detailed system configuration example of the embodiment.

In the above described embodiment, as shown in FIG. 2, the robot controller includes an input unit (external I/F unit 160) that receives operation instruction information, a database (storage unit 110) that stores the grasp pattern information, and the processing unit 120 that performs control processing of the robot 30 based on the information from the input unit and the information from the database. The input unit receives a series of first to N-th operation instructions as operation instruction information. The processing unit 120 loads the i-th grasp pattern information (group of grasp pattern information) that enables execution of the i-th operation instruction and the j-th grasp pattern information that enables execution of the j-th operation instruction of the first to N-th operation instructions from the database. Then, the processing unit 120 performs control processing based on the i-th grasp pattern information and the j-th grasp pattern information.

Here, the operation instruction information refers to information for instruction of the operation of the robot 30, and an instruction such as "place work in place P1 into place P2 with surface C down" is assumed. The operation instruction information may be dissolved into the series of first to N-th operation instructions as described above. In the above described example, there are three operation instructions of (1) confirming a situation in which the work is placed, (2) grasping the work with the hand, and (3) placing the work in the place P2 with the surface C of the work down. Further, the grasp pattern information is information describing the operation pattern when the hand 330 grasps the work. For example, the information may be information representing a specific grasp pattern such as "grasping B-B' from surface A" as shown in FIG. 6, or information according to the grasp pattern. Note that, in the case where a specific operation instruction is provided, plural executable grasp patterns may be assumed. Accordingly, the information on the grasp patterns determined from the operation instruction is referred to as "grasp pattern information". In the example of FIG. 6, the information representing the six grasp patterns in the table is the grasp pattern information. The number of grasp patterns specified by the grasp pattern information may be one or more (a group of grasp patterns).

Thereby, in the case where the operation instruction information (specifically, a flow of the series of operation instructions, i.e., a scenario) is provided, it becomes possible to acquire executable grasp pattern information with respect to each unit operation, and perform control processing based on the grasp pattern information in the current state and the grasp pattern information in the next state. Therefore, the control processing is performed in consideration of not only the current state but also the next state, and thus, a grasp technique not to be an obstacle for the next operation may be determined.

Further, the processing unit 120 may perform control processing of the robot 30 by selecting a combination of grasp patterns that enable sequential execution of the i-th operation instruction and the j-th operation instruction from the i-th group of grasp patterns represented by the i-th grasp pattern information and the j-th group of grasp patterns represented by the j-th grasp pattern information.

Thereby, as a specific method of the control processing based on the i-th grasp pattern information and the j-th grasp pattern information, it is possible to select a combination of grasp patterns that enable sequential execution of the i-th and j-th operation instructions from the i-th group of grasp patterns and the j-th group of grasp patterns. Specifically, as will be described later, a situation where the same one is selected from the i-th group of grasp patterns and the j-th group of grasp patterns is assumed. In this manner, a combination of grasp patterns that enable execution of the operation in the current state and execution of the operation in the next state may be selected, and thereby, a grasp technique that enables smooth execution of the operation instruction in the current state and the operation instruction in the next state may be determined.

Further, the i-th operation instruction may be an operation instruction of instructing grasping of the work and the j-th operation instruction may be at least one of an operation instruction of moving the grasped work and an operation instruction of changing the position of the grasped work. In this regard, the processing unit 120 may perform control processing of the robot by selecting the same one of the i-th group of grasp patterns and the j-th group of grasp patterns.

Here, in the example of FIG. 6, the selection of the same one refers to selection of the same grasp pattern in both the grasp direction and the grasp surface among the six patterns in the table of the state 1 and the six patterns in the table of the state 2. Specifically, the grasp pattern of grasping B-B' from surface A and the grasp pattern of grasping B-B' from surface C are selected.

Thereby, an efficient grasp technique with a single arm can be determined. Specifically, to perform processing with a signal arm corresponds to the case where the work is grasped with one hand as described above and moved and changed in position or the like with the work grasped with the hand (after moving or changing in position, the work may be placed by a release operation or not be placed). It is impossible for the robot to re-grasp the work in the hand, and thus, if grasping the work once, impossible to change the grasp surface or the grasp direction. That is, if the grasping operation is performed once with a single-arm robot, a job is performed in the same grasp location unless the release operation is inserted. Here, in view of the characteristics, if the job instruction with the single arm is continued, the same one may be selected from the i-th group of grasp patterns and the j-th group of grasp patterns in consideration of the continuity of the same grasp pattern in the current state and the next state.

Furthermore, the state of the work before grasping is referred to as "first state" and the state of the work after moving or changing in position is referred to as "second state". In this case, the i-th group of grasp patterns may be grasp patterns of grasping the work in the first state and the j-th group of grasp patterns may be grasp patterns of grasping the work in the second state. Under the condition, the processing unit 120 may perform control processing of the robot 30 by selecting the same one of the i-th group of grasp patterns and the j-th group of grasp patterns.

Thereby, it becomes possible to clarify the i-th group of grasp patterns and the j-th group of grasp patterns. For example, in the scenario in which the work placed there is grasped and placed with another surface down, the work is grasped and rotated, and then, the release operation is performed. Accordingly, there has been a possibility that it is unclear which state of the work (before rotation or after rotation) to be grasped by the grasp pattern is referred to in the j-th group of grasp patterns, in particular. Here, in the case where the i-th operation instruction and the j-th operation instruction are given, the state of the work is determined with reference to the state before the i-th operation instruction and the state after the j-th operation instruction, and the pattern of grasping the work in the determined state is selected as the grasp pattern.

In addition, the i-th operation instruction may be an operation instruction of instructing grasping of the work with one hand of the first hand and the second hand, the j-th operation instruction may be an operation instruction of instructing performance of a switching operation and grasping of the work with the other hand of the first hand and the second hand. In this regard, the processing unit 120 may perform control processing of the robot by selecting the grasp pattern that enables grasping with both hands of the first hand and the second hand at the same time from the i-th group of grasp patterns and the j-th group of grasp patterns.

Thereby, an efficient grasp technique with dual arm can be determined. Specifically, to perform processing with the dual arm may correspond to an operation of switching the work grasped with one hand to the other hand as described above. If there is a condition that neither of the hands grasps the work, the work drops, and the situation is unlikely. Accordingly, to perform the switching operation, it is necessary that the grasping operation is performed at the same time with both the first hand and the second hand. Therefore, by selecting the pattern that enables the operation, the grasp pattern for smoothly performing the switching operation or the like may be determined. Specifically, the grasp pattern as shown in FIG. 10 is assumed.

Further, the database may store information for identification of a direction of grasping and a surface of grasping as the grasp pattern information.

Thereby, as a specific example of the grasp pattern, data shown in the table of FIG. 6 can be used. Here, a robot having plural fingers and grasping the work by holding it between the fingers is assumed. In this case, the grasp pattern may be described by determining the direction of grasping (from which surface to grasp) and the surface of grasping (the surface to be in contact with the fingers). The grasp pattern may be described by two elements, and thus, the data structure and processing can be made simpler.

Furthermore, the database may store hand identification information as information for identification of the hand and work identification information as information for identification of work. The processing unit 120 performs control processing of the robot 30 based on the hand identification information and the work identification information. Here, the hand identification information is at least one of size information of the hand and position information of the hand, and the work identification information is at least one of size information of the work and position information of the work.

Thereby, the control processing of the robot 30 can be performed using the information on the hand and the information on the work. Note that the hand identification information has been at least one of size information and position information of the hand, however, the size information may include information on the shapes in addition to the information of the sizes themselves and the position information may be further divided into plural pieces of angle information or the like. This is the same with the work identification information. Further, the hand identification information and the work identification information may include information other than the size information and the position information.

Figure 1:
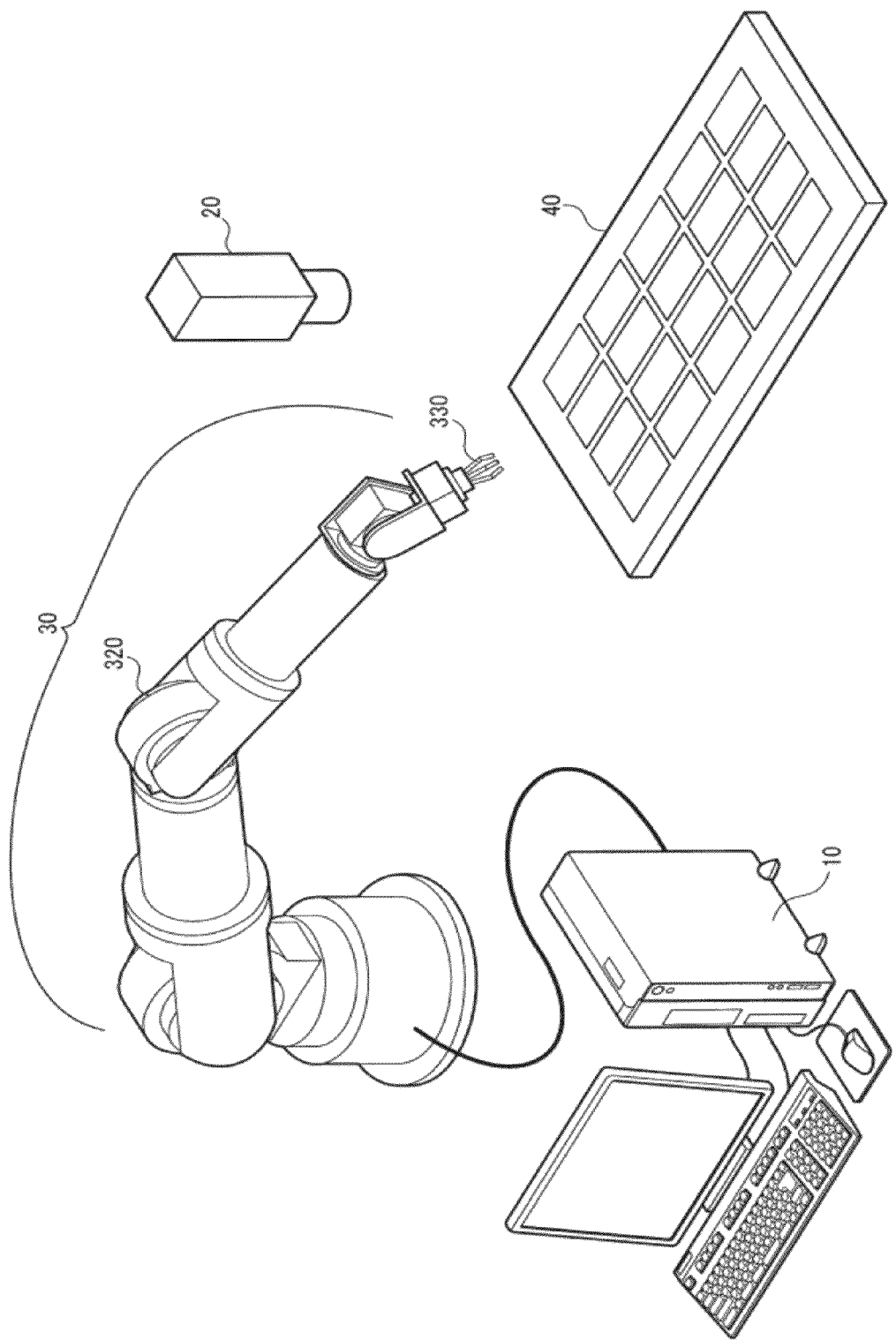
FIG. 1 shows a system configuration example of an embodiment.

The information is stored in the hand DB 118, the work DB 112, or the like in FIG. 1, for example.

Furthermore, the processing unit 120 may acquire the grasp pattern information that enables execution of the operation instruction specified by the operation instruction information based on the hand identification information and the work identification information and the operation instruction information from the database.

Thereby, the grasp pattern information can be acquired based on the information on the hand, the information on the work, and the operation instruction information from the database. That is, if information as to which operation is operated on which work using which hand is determined, possible grasp pattern information may be determined.

In addition, the database may store arm identification information for identification of the arm 320. Under the condition, the processing unit 120 performs control processing of the robot 30 based on the hand identification information, the work identification information, and the arm identification information. Here, the arm identification information may be at least one of length information of the arm and rotation information of the arm.

Thereby, the control processing of the robot 30 can be performed using the information on the arm in addition to the information on the hands and the information on the work. For example, the example in which the efficient grasp technique is limited due to constraints by the length of the arm as shown in FIGS. 12A and 12B and the example in which the efficient grasp technique is limited due to constraints by the rotatable range of the arm as shown in FIGS. 14A and 14B may be addressed. Note that the arm identification information is information on the arm, may include elements relating to determination of the grasp pattern information, and is not limited to the length information and the rotation information.

Further, a position detection unit that detects the position of the work (for example, the image processing part 126 of processing information from the imaging device 20 or the like) may be included. Under the condition, the processing unit 120 performs control processing of the robot 30 based on the position information of the work.

Thereby, control processing using the position information of the work can be performed. As shown in FIG. 1, for example, performance of the processing on the work placed on the palette 40 is assumed, however, in this case, the work may not necessarily be placed in a fixed orientation. Since the robot 30 is assumed to perform processing on the specific location of the work, it is very useful to detect the position information of the work and perform processing on an appropriate part of the work.

Furthermore, if plural grasp patterns are selected as grasp patterns that allow the robot 30 to perform operations corresponding to the first to N-th operation instructions, the processing unit 120 may perform processing of presenting the selected grasp patterns.

Thereby, if the plural grasp patterns are left as appropriate grasp patterns, they can be presented to the user. Specifically, a pattern of grasping a location at a shorter distance requiring less movement, a pattern in which a joint moves to a smaller angle, a pattern of using a position in which any unnecessary force is not applied to the arm or a position with higher operation accuracy may be selected.

In addition, the embodiment relates to a robot system including the above described robot controller and a robot having an arm with a hand.

Thereby, the above described robot controller controls the robot 30, and thus, a robot system performing operations in coordination can be realized.

Note that the embodiment has been explained in detail as described above, however, a person skilled in the art could easily understand that many modifications may be made without substantively departing from the new matter and effects of the invention. Therefore, the modification examples may be within the scope of the invention. For example, in the specification or the drawings, the terms described with the broader or synonymous different terms at least once may be replaced by the different terms in any part of the specification or the drawings. Further, the configurations and the operations of the robot controller, the robot system, etc. are not limited to those explained in the embodiment, and various modifications may be implemented.

The entire disclosure of Japanese Patent Application No. 2011-074390, filed Mar. 30, 2011 is expressly incorporated by reference herein.

What is claimed is:

1. A robot controller of a robot having an arm with a hand that can grasp work, the robot controller comprising:
    an input unit that receives operation instruction information, the operation instruction information being information for instruction of an operation of the robot;
    a database that stores grasp pattern information, the grasp pattern information being information for operation patterns when the hand grasps the work; and
    a processing unit that performs control processing of the robot based on the operation instruction information and the grasp pattern information,
    wherein the operation instruction information includes a first operation instruction and a second operation instruction, the second operation instruction is performed after the first operation instruction, and
    the processing unit selects a candidate grasp pattern for the first operation instruction from the grasp pattern information stored in the database based on the second operation instruction, and performs the first operation instruction using the candidate grasp pattern.

2. The robot controller according to claim 1, wherein the processing unit performs control processing of the robot by selecting a combination of grasp patterns that enable sequential execution of the first operation instruction and the second operation instruction.

3. The robot controller according to claim 1, wherein the first operation instruction is an operation instruction of instructing grasping of the work,
    the second operation instruction is at least one of an operation instruction of moving the grasped work and an operation instruction of changing a position of the grasped work, and
    the processing unit performs control processing of allowing the robot to perform an operation corresponding to the first operation instruction and the second operation instruction by selecting the candidate grasp pattern based on the second operation instruction.

4. The robot controller according to claim 3, wherein, given that a state of the work before grasping is a first state and a state of the work after moving or changing in position is referred to as a second state,
    a first group of grasp patterns are a group of grasp patterns of grasping the work in the first state and are represented by a first group of grasp pattern information among the grasp pattern information stored in the database,
    a second group of grasp patterns are a group of grasp patterns of grasping the work in the second state and are represented by a second group of grasp pattern information among the grasp pattern information stored in the database, and the processing unit performs control processing of allowing the robot to perform an operation corresponding to the first operation instruction and the second operation instruction by selecting the candidate grasp pattern as a subject grasp pattern that is the same for the first group of grasp pattern and the second group of grasp pattern.

5. The robot controller according to claim 1, wherein the first operation instruction is an operation instruction of instructing grasping of the work with one hand of a first hand and a second hand of the robot, the second operation instruction is an operation instruction of instructing performance of a switching operation of the work and grasping of the work with the other hand of the first hand and the second hand, and the processing unit performs control processing of allowing the robot to perform an operation corresponding to the first operation instruction and the second operation instruction by selecting a grasp pattern that enables grasping with both hands of the first hand and the second hand at the same time from a first group of grasp patterns and a second group of grasp patterns, the first group of grasp pattern and second group of grasp pattern are represented by a first group of grasp pattern information and a second group of grasp pattern information, respectively, which are among the grasp pattern information stored in the database.

6. The robot controller according to claim 1, wherein the database stores pattern information for identification of a direction of grasping and a surface of grasping as the grasp pattern information.

7. The robot controller according to claim 1, wherein the database stores hand identification information as information for identification of the hand and work identification information as information for identification of the work, and the processing unit performs control processing of the robot based on the hand identification information and the work identification information.

8. The robot controller according to claim 7, wherein the processing unit acquires the grasp pattern information that enables execution of the operation instruction specified by the operation instruction information based on the hand identification information, the work identification information, and the operation instruction information from the database.

9. The robot controller according to claim 7, wherein the database stores at least one of hand size information and hand position information as the hand identification information, and stores at least one of work size information and work position information as the work identification information.

10. The robot controller according to claim 7, wherein the database stores arm identification information for identification of the arm, and the processing unit performs control processing of the robot based on the hand identification information, the work identification information, and the arm identification information.

11. The robot controller according to claim 10, wherein the database stores at least one of length information of the arm and rotation information of the arm as the arm identification information.

12. The robot controller according to claim 1, further comprising a position information detection unit that detects position information of the work, wherein the processing unit performs control processing of the robot based on the position information.

13. The robot controller according to claim 1, wherein, when a plurality of grasp patterns are selected as the candidate grasp pattern, the processing unit presents the plurality of grasp patterns to a user.

14. A robot system comprising:
the robot controller according to claim 1; and
a robot having the arm with the hand that grasps the work.

15. A robot system comprising:
the robot controller according to claim 2; and
a robot having the arm with the hand that grasps the work.

16. A robot system comprising:
the robot controller according to claim 3; and
a robot having the arm with the hand that grasps the work.

17. A robot system comprising:
the robot controller according to claim 4; and
a robot having the arm with the hand that grasps the work.

18. A robot system comprising:
the robot controller according to claim 5; and
a robot having the arm with the hand that grasps the work.

19. A robot system comprising:
the robot controller according to claim 6; and
a robot having the arm with the hand that grasps the work.

20. A robot system comprising:
a robot having an arm with a hand that can grasp work;
an input unit that receives operation instruction information, the operation information being information for instruction of an operation of the robot;
a database that stores grasp pattern information, the grasp pattern information being information for operation patterns when the hand grasps the work; and
a processing unit that performs control processing of the robot based on the operation instruction information and the grasp pattern information,
wherein the operation instruction information includes a first operation instruction and a second operation instruction, the second operation instruction is performed after the first operation instruction, and
the processing unit selects a candidate grasp pattern for the first operation instruction from the grasp pattern information stored in the database based on the second operation instruction, and performs the first operation instruction using the candidate grasp pattern.

* * * * *